United States Patent
Malaescu et al.

(10) Patent No.: US 10,148,945 B1
(45) Date of Patent: Dec. 4, 2018

(54) METHOD FOR DYNAMICALLY CALIBRATING AN IMAGE CAPTURE DEVICE

(71) Applicant: FotoNation Limited, Galway (IE)

(72) Inventors: Alexandru Malaescu, Bucharest (RO); Florin Nanu, Bucharest (RO)

(73) Assignee: FotoNation Limited, Galway (IE)

(*) Notice: Subject to any disclaimer, the term of this patent is extended or adjusted under 35 U.S.C. 154(b) by 0 days.

(21) Appl. No.: 15/605,159

(22) Filed: May 25, 2017

(51) Int. Cl.
*H04N 5/232* (2006.01)
*H04N 17/00* (2006.01)
(Continued)

(52) U.S. Cl.
CPC .......... *H04N 17/002* (2013.01); *G03B 13/36* (2013.01); *G03B 43/00* (2013.01); *G06T 7/70* (2017.01);
(Continued)

(58) Field of Classification Search
CPC .. H04N 5/23212; H04N 17/002; G03B 13/36; G03B 43/00; G06T 7/80
See application file for complete search history.

(56) References Cited

U.S. PATENT DOCUMENTS 8,970,770 B2  3/2015  Nanu et al.

2009/0102403 A1* 4/2009 Lule .................. H02K 41/0356
318/135
(Continued)

FOREIGN PATENT DOCUMENTS

| EP | 3151048 A1 | 4/2017 |
| WO | WO/2016/000874 A1 | 5/2015 |
| WO | WO2016/091545 A1 | 6/2016 |

OTHER PUBLICATIONS

European Patent Office, Extended European Search Report for EP App. No. 18170272.1 dated Oct. 26, 2018 for "Method for Dynamically Calibrating an Image Capture Device", 13 pages.

*Primary Examiner* — Daniel M Pasiewicz (57) ABSTRACT

A method for dynamically calibrating an image capture device comprises: a) determining a distance ($D_{CRT}$, $D_{EST}$) to an object within a scene; b) determining a first lens actuator setting ($DAC^{INIT}$) for the determined distance; c) determining a second lens actuator setting ($DAC^{FOCUS}$) providing maximum sharpness for the object in a captured image of the scene; and d) storing the determined distance ($D_{CRT}$, $D_{EST}$) and the first and second lens actuator settings. These steps are repeated at a second determined distance separated from the first determined distance. A calibration correction ($ERR_{NEAR}^{PLP}$, $ERR_{FAR}^{PLP}$) for stored calibrated lens actuator settings ($DAC_{NEAR}^{PLP}$, $DAC_{FAR}^{PLP}$) is determined as a function of at least: respective differences between the second lens actuator setting ($DAC^{FOCUS}$) and the first lens actuator setting ($DAC^{INIT}$) for each of the first and second determined distances; and the stored calibrated lens actuator settings are adjusted according to the determined calibration corrections.

17 Claims, 3 Drawing Sheets

(51) Int. Cl.
*G03B 13/36* (2006.01)
*G03B 43/00* (2006.01)
*G06T 7/70* (2017.01)
*G06T 7/80* (2017.01)

(52) U.S. Cl.
CPC ........... *G06T 7/80* (2017.01); *H04N 5/23212* (2013.01); *H04N 5/23219* (2013.01)

(56) References Cited

U.S. PATENT DOCUMENTS

| | | | | |
|---|---|---|---|---|
| 2009/0202235 | A1* | 8/2009 | Li | H04N 5/23212 396/125 |
| 2016/0014404 | A1* | 1/2016 | Krestyannikov | G06T 7/80 348/187 |
| 2016/0147131 | A1* | 5/2016 | Richards | G03B 13/36 348/187 |
| 2016/0165129 | A1* | 6/2016 | Malaescu | H04N 5/23219 348/135 |
| 2017/0155896 | A1* | 6/2017 | Malaescu | G02B 7/28 |
| 2018/0041754 | A1* | 2/2018 | Nanu | H04N 5/23219 |

\* cited by examiner

METHOD FOR DYNAMICALLY CALIBRATING AN IMAGE CAPTURE DEVICE

FIELD

The present invention relates to a method for dynamically calibrating an image capture device.

BACKGROUND

Figure 1:
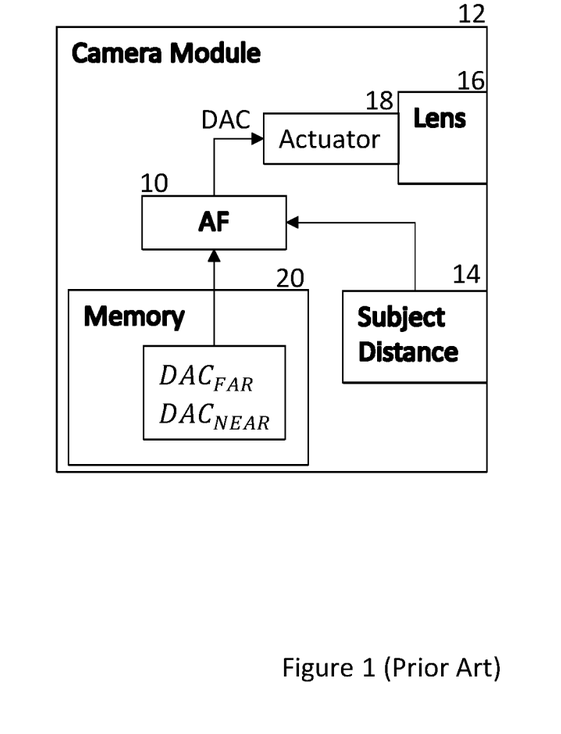
FIG. 1 illustrates schematically a typical auto-focusing camera module.

Referring now to FIG. 1, a typical auto-focus (AF) module 10 for a camera module 12 within an image capture device can obtain an estimate for the distance from the camera module to the target object, for example, from a laser device or stereo camera system 14. Knowing the estimated subject distance, the auto-focus module 10 can compute a required physical position for a lens 16 to bring the target object into focus. As explained in WO 2016/000874 (Ref: FN-396-PCT), the disclosure of which is herein incorporated by reference, lens position is typically controlled by a lens actuator 18 which is driven by a digital to analog convertor (DAC)—often using an 8-bit DAC code with 255 distinct voltage output levels, or a 10-bit DAC code with 1024 voltage levels—provided by the AF module 10. Thus the AF module 10 determines a required DAC code for a subject distance and the DAC converts the DAC code into an equivalent analog actuator voltage or current value depending on the actuator output circuitry, for example, depending on whether the lens 16 comprises a VCM (voice coil module) or MEMs (micro-electromechanical systems) lens actuator, to determine the lens position.

Once the relationship between DAC code and lens position is determined, for example, there can be a linear relationship between the two, the camera module can be calibrated by adjusting the DAC codes for infinity and macro distances:

$DAC_{FAR}[t]$–physical lens position to focus at far (infinity) distance at time $[t]$   [1]

$DAC_{NEAR}[t]$–physical lens position to focus at near (macro) distance at time $[t]$   [2]

These calibration parameters can be determined during a production line process (PLP) and their values stored in a non-volatile memory 20 inside the camera module 12 or elsewhere in the camera.

Thus, the auto-focus module 10 can determine the required DAC code to be supplied to the lens actuator 18 as a function of the distance to the target object as well as $DAC_{NEAR}[t]$ and $DAC_{FAR}[t]$.

It is known that the camera module 12 may be affected by operating conditions such as SAG (gravity influence) or thermal (temperature influence) and WO 2016/000874 (Ref: FN-396-PCT) discloses some methods to compensate for SAG and thermal effects by adjusting $DAC_{NEAR}[t]$ and $DAC_{FAR}[t]$ according to operating conditions.

Nonetheless, there may be other components contributing to calibration error including inaccuracies, due to some limitations of the PLP or, as disclosed in WO 2016/000874 (Ref: FN-395-PCT), camera module performance drifting over time, for example, due to device aging or even device on-time.

If PLP, SAG or thermal errors are not compensated accordingly, the DAC code computed by AF module will not provide proper focus on the target object.

The camera module may then be required to hunt for focus and this both impacts adversely on focus speed as well as causing an unacceptable lens wobble effect within a preview stream.

It is an object of the present application to mitigate these problems.

SUMMARY

According to the present invention there is provided a method for dynamically calibrating an image capture device according to claim 1.

According to a second aspect there is provided a computer program product comprising a computer readable medium on computer readable instructions are stored and which when executed on an image capture device are arranged to perform the steps of claim 1.

According to a third aspect there is provided an image capture device configured to perform the steps of claim 1.

The present method runs on an image capture device, possibly within a camera module, and dynamically compensates for calibration errors while the user is operating the device.

The method does not affect the production line process and collects the necessary data while the user is operating the device, without adversely affecting the user experience. The method can improve auto-focus speed and minimize lens wobble when estimating the calibration error and then updating the calibration parameters.

The method can be triggered from time to time to check if the calibration parameters haven't been affected by for example, camera ageing, and if so, perform the necessary corrections.

BRIEF DESCRIPTION OF THE DRAWINGS

An embodiment of the invention will now be described, by way of example, with reference to the accompanying drawings, in which.

DESCRIPTION OF THE EMBODIMENT

Calibration errors, other than those caused by SAG or thermal effects and referred to herein generally as PLP errors can be quantified as follows:

$$\begin{cases} ERR_{FAR}^{PLP} = DAC_{FAR}[t] - DAC_{FAR}^{PLP} & [3] \\ ERR_{NEAR}^{PLP} = DAC_{NEAR}[t] - DAC_{NEAR}^{PLP} & [4] \end{cases}$$

where:

$DAC_{FAR}^{PLP}$ and $DAC_{NEAR}^{PLP}$ are the stored calibration parameters for the camera module (CM). This can be measured and determined at production time, or they can be updated from time to time during camera operation as disclosed in WO 2016/000874 (Ref: FN-395-PCT).

Thus, $DAC_{FAR}[t]$ and $DAC_{NEAR}[t]$ are the desired corrected calibration parameters at time [t], while $ERR_{FAR}^{PLP}$ and $ERR_{NEAR}^{PLP}$ are the respective errors in these parameters.

To illustrate the impact of the errors in equations [3] and [4] against the final focus position, let us assume a target object is placed at distance [D] from the camera. Typically, in a handheld image capture device such as a consumer camera, smartphone, tablet computer or equivalent, the object of interest is a human face. The corresponding lens position [$DAC_D$] to focus at distance [D] is given by the following formula:

$$DAC_D = DAC_{FAR}[t] + \frac{1}{m} * (L_D - L_{FAR}) \quad [5]$$

Assuming a linear DAC function, the additional parameters together with their formula are detailed in table 1:

TABLE 1

List of parameters used for mapping the distance to the lens position (DAC)

| Parameter | Description | Unit | Formula | |
|---|---|---|---|---|
| $DAC_{FAR}[t]$ | See [1] | DAC codes | $ERR_{FAR}^{PLP} + DAC_{FAR}^{PLP}$ | [6] |
| $DAC_{NEAR}[t]$ | See [2] | DAC codes | $ERR_{NEAR}^{PLP} + DAC_{NEAR}^{PLP}$ | [7] |
| m | Actuation slope | mm/ DAC codes | $\frac{L_{NEAR} - L_{FAR}}{DAC_{NEAR}[t] - DAC_{FAR}[t]}$ | [8] |
| $L_{FAR}$ | Lens displacement to focus at $D_{FAR}$ | mm | $L_{FAR} = \frac{f^2}{D_{FAR} - f}$ | [9] |
| $L_{NEAR}$ | Lens displacement to focus at $D_{NEAR}$ | mm | $L_{NEAR} = \frac{f^2}{D_{NEAR} - f}$ | [10] |
| $L_D$ | Lens displacement to focus at current distance [D] | mm | $L_D = \frac{f^2}{D - f}$ | [11] |
| $D_{FAR}$ | Far distance (set by CM manufacturer) | mm | — | |
| $D_{NEAR}$ | Near distance (set by CM manufacturer) | mm | — | |
| f | Focal length of the system | mm | — | |

Nonetheless, it will be appreciated that the invention is also applicable to a non-arithmetic, but nonetheless linear relationship between DAC codes and lens position.

Equations [9], [10] and [11] are derived from thin lens equation:

$$\frac{1}{f} = \frac{1}{f + L_D} + \frac{1}{D}$$

Replacing [6], [7], [8] in [5], the new formula for computing the DAC value becomes:

$$\begin{cases} DAC_D = DAC_D^{INIT} + ERR_D & [12] \\ \text{Where:} \\ DAC_D^{INIT} = DAC_{FAR}^{PLP} + \frac{(DAC_{NEAR}^{PLP} - DAC_{FAR}^{PLP}) * (L_D - L_{FAR})}{(L_{NEAR} - L_{FAR})} & [13] \\ ERR_D = ERR_{FAR}^{PLP} + (ERR_{NEAR}^{PLP} - ERR_{FAR}^{PLP}) * \frac{(L_D - L_{FAR})}{(L_{NEAR} - L_{FAR})} & [14] \end{cases}$$

Replacing [9], [10], [11] in [13] and [14], the final formula which estimates the DAC value is given by:

$$\begin{cases} DAC_D = DAC_D^{INIT} + ERR_D & [15] \\ \text{Where:} \\ DAC_D^{INIT} = DAC_{FAR}^{PLP} + (DAC_{NEAR}^{PLP} - DAC_{FAR}^{PLP}) * \frac{(D_{FAR} - D)}{(D_{FAR} - D_{NEAR})} * \frac{(D_{NEAR} - f)}{(D - f)} & [16] \\ ERR_D = ERR_{FAR}^{PLP} + (ERR_{NEAR}^{PLP} - ERR_{FAR}^{PLP}) * \frac{(D_{FAR} - D)}{(D_{FAR} - D_{NEAR})} * \frac{(D_{NEAR} - f)}{(D - f)} & [17] \end{cases}$$

$ERR_D$ is the overall error generated by PLP errors ($ERR_{FAR}^{PLP}$ and $ERR_{NEAR}^{PLP}$).

Figure 2:
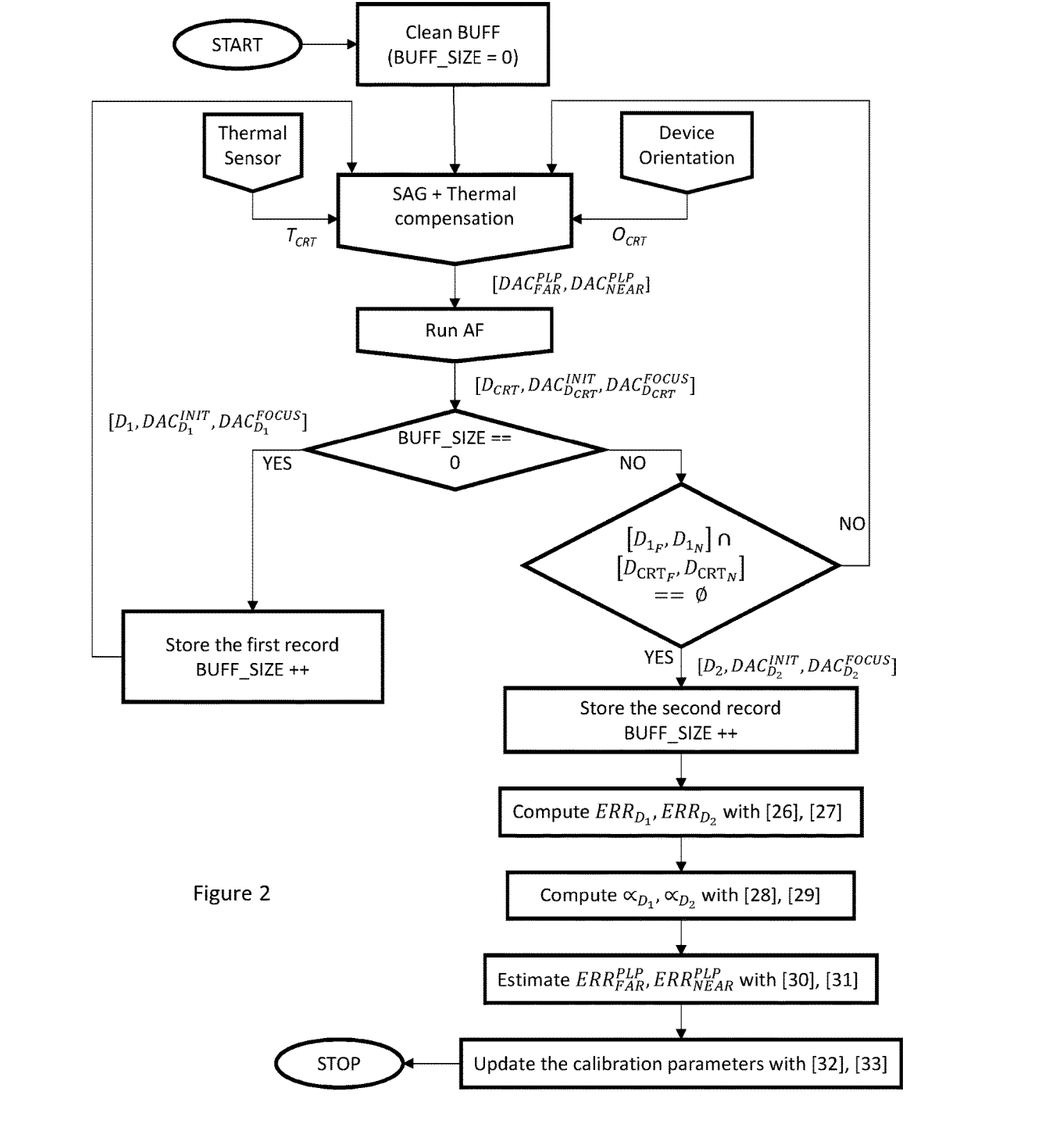
FIG. 2 illustrates a method for dynamically calibrating an image capture device according to a first embodiment of the present invention.

Referring now to FIG. 2, the first step of a compensation method according to one embodiment is to collect input data in an internal buffer (BUFF) while the user is operating the camera. This process can be done transparently without affecting the user experience. An input record should contain the data summarized in table 2. The buffer should have enough space to store at least 2 records.

TABLE 2

Dynamic compensation input data

| Data | Description | Unit |
|---|---|---|
| $T_{CRT}$ | Current sensor temperature (provided by the internal thermal sensor of the CM) | Celsius degrees |
| $O_{CRT}$ | Current device orientation relative to horizontal plane (estimated from the output of the device accelerometer) | Degrees |
| $D_{CRT}$ | Current estimated distance to the object (provided by AF algorithm) | Millimeters |
| $DAC_{D_{CRT}}^{INIT}$ | Initial lens position (provided by AF algorithm based on $D_{CRT}$). | DAC codes |
| $DAC_{D_{CRT}}^{FOCUS}$ | Focus lens position (provided by AF algorithm at optimal focus) | DAC codes |

Sensor temperature [$T_{CRT}$] and device orientation [$O_{CRT}$] are used to adjust the original calibration parameters to compensate for the CM being affected by SAG (gravity) or thermal effects, as disclosed in WO 2016/000874 (Ref: FN-395-PCT). To briefly explain how to compensate SAG and thermal effects, assume that during production, the CM orientation was $O_{PLP}$ and the sensor temperature was $T_{PLP}$.

If the CM is affected by SAG, $O_{CRT} \neq O_{PLP}$, then the original calibration parameters are converted into the $O_{CRT}$ range. In the present description, this transformation function is represented as SAG below:

$$[DAC_{FAR}^{PLP}, DAC_{NEAR}^{PLP}]_{O_{CRT}} = SAG(DAC_{FAR}^{PLP}, DAC_{NEAR}^{PLP}, O_{PLP}, O_{CRT})$$

If the CM is not affected by SAG, the calibration parameters will remain unchanged:

$$[DAC_{FAR}^{PLP}, DAC_{NEAR}^{PLP}]_{O_{CRT}} = [DAC_{FAR}^{PLP}, DAC_{NEAR}^{PLP}]$$

If the CM is affected by thermal effect, $T_{CRT} \neq T_{PLP}$, then the calibration parameters after SAG correction are converted into the $T_{CRT}$ range. Again, a transformation function, called TH below, can be used:

$$[DAC_{FAR}^{PLP}, DAC_{NEAR}^{PLP}]_{T_{CRT}} = TH([DAC_{FAR}^{PLP}, DAC_{NEAR}^{PLP}]_{O_{CRT}}, T_{PLP}, O_{CRT})$$

If the CM is not affected by thermal effects, then the calibration parameters resulting from any SAG correction will remain unchanged:

$$[DAC_{FAR}^{PLP}, DAC_{NEAR}^{PLP}]_{T_{CRT}} = [DAC_{FAR}^{PLP}, DAC_{NEAR}^{PLP}]_{O_{CRT}}$$

Note that in each case SAG( ) and TH( ) can involve lookup tables, and again details of how to adjust the $DAC_{FAR}^{PLP}$ and $DAC_{NEAR}^{PLP}$ values to take into account temperature and orientation are disclosed in WO 2016/000874 (Ref: FN-395-PCT).

At this point, PLP errors are unknown. For estimating them, data is collected during AF module operation as follows:
1. Estimate $[D_{CRT}]$ using the laser device or a stereo camera system 14;
2. Use [16] to compute the initial lens position $[DAC_{D_{CRT}}^{INIT}]$ $$DAC_{D_{CRT}}^{INIT} = DAC_{FAR}^{PLP} + (DAC_{NEAR}^{PLP} - DAC_{FAR}^{PLP}) * \frac{(D_{FAR} - D_{CRT})}{(D_{FAR} - D_{NEAR})} * \frac{(D_{NEAR} - f)}{(D_{CRT} - f)}$$

3. Set the lens position to $DAC_{D_{CRT}}^{INIT}$ and start searching the focus position around $DAC_{D_{CRT}}^{INIT}$. The lens should be moved forth or back until the best contrast value is achieved. The lens position with the best contrast value will be the focus position $[DAC_{D_{CRT}}^{FOCUS}]$.

For large PLP errors, the $DAC_{D_{CRT}}^{FOCUS}$ focus position will be far from the initial position $DAC_{D_{CRT}}^{INIT}$. The focus speed will be slow and the lens wobble effect strongly visible.

For small errors, the $DAC_{D_{CRT}}^{FOCUS}$ focus position will be closer to the initial position $DAC_{D_{CRT}}^{INIT}$. The focus speed will be higher and the lens wobble effect less visible.

The goal of dynamic compensation method is to use the above data (provided by steps 1, 2 and 3) to estimate PLP errors. Once the estimation is done, the calibration parameters ($DAC_{FAR}^{PLP}$, $DAC_{NEAR}^{PLP}$) will be properly updated and the lens position provided by [16] will be the focus position. Focus sweeping will not be necessary anymore, and thus the AF module speed will be improved and the lens wobble effect reduced.

One way to define sufficiently good accuracy, is to restrict the errors of $[D_{CRT}]$ and $[DAC_{D_{CRT}}^{FOCUS}]$ to less than set thresholds as follows:

$$|err_{D_{CRT}}| < \frac{DOF_{D_{CRT}}}{4} \qquad [18]$$

$$\left|err_{DAC_{D_{CRT}}^{FOCUS}}\right| < \frac{DAC_{STEP}}{2} \qquad [19]$$

To understand the meaning of $DOF_{D_{CRT}}$ and $DAC_{STEP}$, additional parameters are summarized in table 3.

TABLE 3

| | DOF Parameters | | | |
|---|---|---|---|---|
| Parameter | Description | Unit | Formula | |
| $DOF_D$ | Depth of field at distance [D] | mm | $DOF_D = D_F - D_N$ | [20] |
| $D_F$ | Far limit of DOF at distance [D] | mm | $D_F = \frac{Df^2}{f^2 - Nc(D-f)}$ | [21] |
| $D_N$ | Near limit of DOF at distance [D] | mm | $D_N = \frac{Df^2}{f^2 - Nc(D-f)}$ | [22] |
| N | Relative aperture (F#) of the lens system | — | — | |
| c | Circle of confusion | mm | $c = 2 * P_S$ | [23] |
| $P_S$ | Pixel size | mm | — | |
| f | Focal length of the system | mm | — | |

$DAC_{STEP}$ is the absolute difference between the corresponding DAC values at $D_F$ and $D_N$ distances. Using [15], [16] and assuming $ERR_{D_F} \approx ERR_{D_N}$, an estimated value of $DAC_{STEP}$ is given by:

$$DAC_{STEP} = |DAC_{D_F} - DAC_{D_N}| \Leftrightarrow \qquad [24]$$

$$\Leftrightarrow DAC_{STEP} =$$

$$\left| \frac{(DAC_{NEAR}^{PLP} - DAC_{FAR}^{PLP}) * (D_{NEAR} - f) * (D_{FAR} - f)}{(D_{FAR} - D_{NEAR})} \right| *$$

$$\left| \frac{(D_N - D_F)}{(D_F - f) * (D_N - f)} \right|$$

$DAC_{STEP}$ should be a constant value (should not vary with the distance D).

The second step of the compensation method is to estimate the errors [3] and [4] and to update the calibration parameters. It requires, two input records ($T_{CRT}$, $O_{CRT}$, $D_{CRT}$, $DAC_{D_{CRT}}^{INIT}$, $DAC_{D_{CRT}}^{FOCUS}$) which satisfy the following condition:

$$[D_{1_F}, D_{1_N}] \cap [D_{2_F}, D_{2_N}] = \emptyset \qquad [25]$$

where:

$[T_1, O_1, D_1, DAC_{D_1}^{INIT}, DAC_{D_1}^{FOCUS}]$ is the first record.
$[T_2, O_2, D_2, DAC_{D_2}^{INIT}, DAC_{D_2}^{FOCUS}]$ is the second record.

$[D_{1_F}, D_{1_N}]$ is the DOF range at first distance $D_1$ ($D_{1_F}$ is the far limit, $D_{1_N}$ is the near limit).

$[D_{2_F}, D_{2_N}]$ is the DOF range at second distance $D_2$ ($D_{2_F}$ is the far limit, $D_{2_N}$ is the near limit). If the test of equation [25] is satisfied (the two distances are quite different), then using [15] and replacing $[DAC_D, D]$ with $[DAC_{D_1}^{FOCUS}, D_1]$ and $[DAC_{D_2}^{FOCUS}, D_2]$, the resulting $ERR_{D_1}$ and $ERR_{D_2}$ are:

$$ERR_{D_1} = DAC_{D_1}^{FOCUS} - DAC_{D_1}^{INIT} \qquad [26]$$

$$ERR_{D_2} = DAC_{D_2}^{FOCUS} - DAC_{D_2}^{INIT} \qquad [27]$$

where:

$DAC_{D_1 INIT}$ and $DAC_{D_2 INIT}$ are computed using [16].

Using [17] and replacing [$ERR_D$, D] with [$ERR_{D_1}$, $D_1$] and [$ERR_{D_2}$, $D_2$], it results the following linear system:

$$\begin{cases} ERR_{D_1} = ERR_{FAR}^{PLP} + (ERR_{NEAR}^{PLP} - ERR_{FAR}^{PLP}) * \frac{(D_{FAR} - D_1)}{(D_{FAR} - D_{NEAR})} * \\ \qquad\qquad \frac{(D_{NEAR} - f)}{(D_1 - f)} \\ ERR_{D_2} = ERR_{FAR}^{PLP} + (ERR_{NEAR}^{PLP} - ERR_{FAR}^{PLP}) * \frac{(D_{FAR} - D_2)}{(D_{FAR} - D_{NEAR})} * \\ \qquad\qquad \frac{(D_{NEAR} - f)}{(D_2 - f)} \end{cases}$$

To simplify the above system, the following substitutions will be done:

$$\begin{cases} \alpha_{D_1} = \frac{(D_{FAR} - D_1)}{(D_{FAR} - D_{NEAR})} * \frac{(D_{NEAR} - f)}{(D_1 - f)} & [28] \\ \alpha_{D_2} = \frac{(D_{FAR} - D_2)}{(D_{FAR} - D_{NEAR})} * \frac{(D_{NEAR} - f)}{(D_2 - f)} & [29] \end{cases}$$

The new system becomes:

$$\begin{cases} ERR_{D_1} = ERR_{FAR}^{PLP} + (1 - \alpha_{D_1}) + \alpha_{D_1} ERR_{NEAR}^{PLP} \\ ERR_{D_2} = ERR_{FAR}^{PLP} + (1 - \alpha_{D_2}) + \alpha_{D_2} ERR_{NEAR}^{PLP} \end{cases}$$

PLP errors can now be estimated with the following formulae:

$$\begin{cases} ERR_{FAR}^{PLP} = \frac{\alpha_{D_2} * ERR_{D_1} - \alpha_{D_1} * ERR_{D_2}}{\alpha_{D_2} - \alpha_{D_1}} & [30] \\ ERR_{NEAR}^{PLP} = \frac{(1 - \alpha_{D_2}) * ERR_{D_1} - (1 - \alpha_{D_1}) * ERR_{D_2}}{\alpha_{D_1} - \alpha_{D_2}} & [31] \end{cases}$$

where:
$ERR_{D_1}$ and $ERR_{D_2}$ are computed using [26] and [27].
$\alpha_{D_1}$ and $\alpha_{D_2}$ are computed using [28] and [29].
The new updated calibration parameters (which should be used further to improve AF module speed and reduced lens wobble effect) are:

$$\begin{cases} DAC_{FAR}^{NEW} = DAC_{FAR}^{PLP} + ERR_{FAR}^{PLP} & [32] \\ DAC_{NEAR}^{NEW} = DAC_{NEAR}^{PLP} + ERR_{NEAR}^{PLP} & [33] \end{cases}$$

In a second embodiment of the present invention, instead of directly measuring a distance to an object in a scene being imaged, the distance can be estimated based on an assumed dimension of an object being imaged, for example, a face. More details about estimating the distance based on face information or indeed any recognizable object with a known dimension can be found in U.S. Pat. No. 8,970,770 (Ref: FN-361) and WO 2016/091545 (Ref: FN-399), the disclosures of which are herein incorporated by reference.

However, as disclosed in WO 2016/091545 (Ref: FN-399), care should be taken when doing so to ensure that the object is not a false image of an object, for example, a billboard showing a large face, or a small printed face or a small child's face, where the assumed dimension may not apply. Thus, the second embodiment aims to provide dynamic compensation to estimate $ERR_{PLP}$ while taking into account that false faces may be present in a scene.

Let assume the distance from the face to the image acquisition device is [D]. The current estimated distance [$D_{EST}$] to that face is computed with the following formula:

$$D_{EST} = f * \frac{ed}{edp * P_S} \qquad [34]$$

where:
f represents the focal length of the lens system
$P_S$ is the pixel size
ed represents the assumed dimension, in this case, eye distance in millimeters for a human face (ed=70 mm)
edp represents the computed eye distance in pixels within the detected face region For those human faces (where ed≈70 mm), formula [1] will provide a good estimation of the distance ($D_{EST}$≈D).

For false faces (ex. a small printed face with ed≈20 mm), formula [1] will provide a wrong distance because it assumes that ed=70 mm.

The lens position [$DAC_D$] to focus at distance [D] is given by the following formula:

$$DAC_D = DAC_{D_{EST}}^{INIT} + ERR_D \qquad [2]$$

where:
$DAC_{D_{EST}}^{INIT}$, the initial lens position computed based on estimated distance [$D_{EST}$], can be calculated as per $DAC_{D_{CRT}}^{INIT}$ in equation [16]; and $$ERR_D = ERR_{PLP} + ERR_{D_{EST}} \qquad [35]$$

Note that in this example, near and far PLP errors are assumed to be almost the same ($ERR_{FAR}^{PLP} \approx ERR_{NEAR}^{PLP} \approx ERR_{PLP}$) and $ERR_{D_{EST}}$ represents an error caused by the wrong estimation of the distance to an object.

Referring now to FIG. 3, again the first step of dynamic compensation method is to collect into an internal buffer (BUFF) the necessary input data while the user is operating the camera. This process should be done transparently without affecting the user experience. Again, an input record should contain the data summarized in table 2, but instead of the measured $D_{CRT}$ of the first embodiment, $D_{EST}$ the estimated distance is used. The buffer should have enough space to store at least 2 records.

Figure 3:
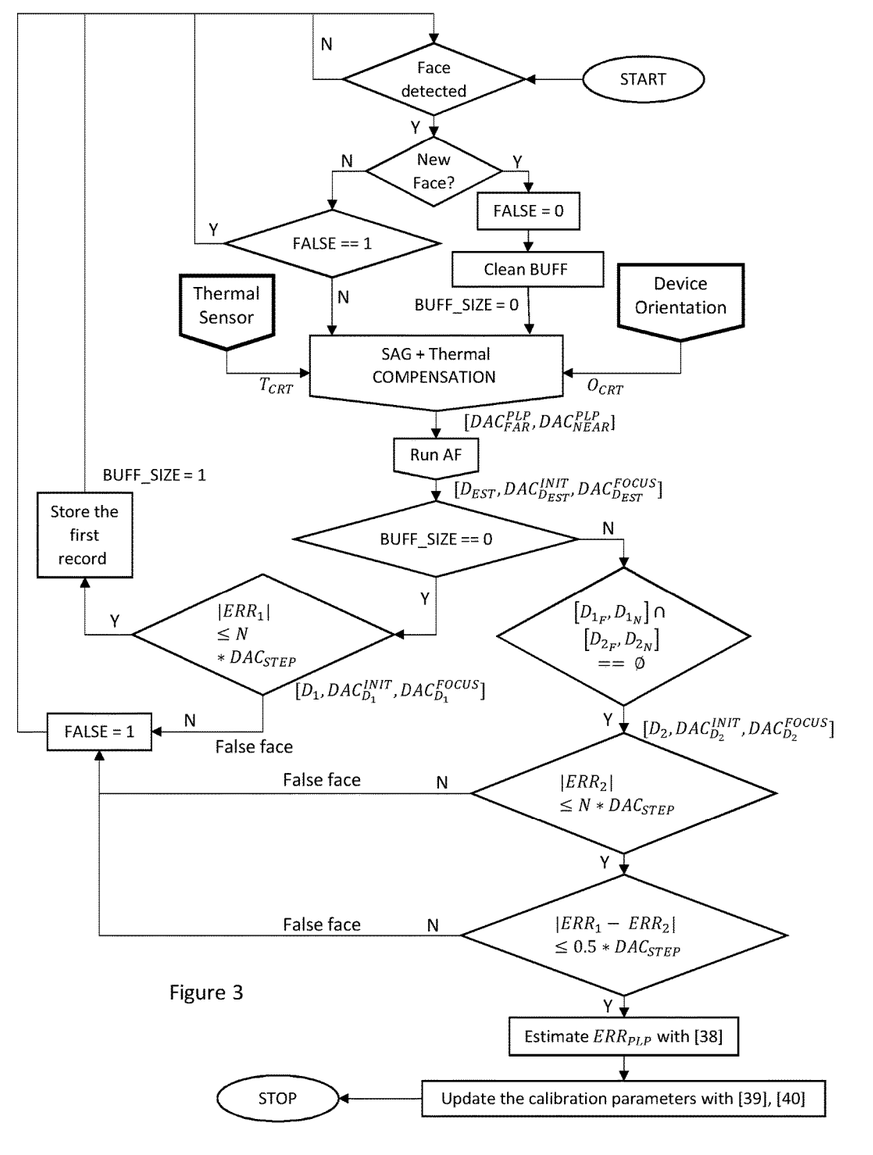
FIG. 3 illustrates a method for dynamically calibrating an image capture device according to a second embodiment of the present invention.

The second step of dynamic compensation process is to estimate $ERR_{PLP}$ and to update the calibration parameters. The embodiment attempts to image a given face at two separate distances, although in variants of the embodiment, measurements from images of different faces could be employed. In any case as in the first embodiment, two input records ($T_{CRT}$, $O_{CRT}$, $D_{EST}$, $DAC_{D_{EST}}^{INIT}$, $DAC_{D_{EST}}^{FOCUS}$) are required which satisfy the following conditions:

$$[D_{1_F}, D_{1_N}] \cap [D_{2_F}, D_{2_N}] = \emptyset \qquad \text{a)}$$

where:
[$T_1$, $O_1$, $D_1$, $DAC_{D_1}^{INIT}$, $DAC_{D_1}^{FOCUS}$] is the first record;
[$T_2$, $O_2$, $D_2$, $DAC_{D_2}^{INIT}$, $DAC_{D_2}^{FOCUS}$] is the second record;
[$D_{1_F}$, $D_{1_N}$] is the DOF range for the first estimated distance ($D_{1_F}$ is the far limit, $D_{1_N}$ is the near limit); and
[$D_{2_F}$, $D_{2_N}$] is the DOF range for the second estimated distance ($D_{2_F}$ is the far limit, $D_{2_N}$ is the near limit).

$$|ERR_1| \leq N * DAC_{STEP}$$

$$|ERR_2| \leq N * DAC_{STEP}$$

$$|ERR_1 - ERR_2| \leq DAC_{STEP}/2 \qquad \text{b)}$$

where $DAC_{STEP}$ is determined as per equation [24] of the first embodiment;

$$ERR_1 \stackrel{[2]}{=} DAC_{D_1}^{FOCUS} - DAC_{D_1}^{INIT}; \text{ and} \quad [36]$$

$$ERR_2 \stackrel{[2]}{=} DAC_{D_2}^{FOCUS} - DAC_{D_2}^{INIT}. \quad [37]$$

As before, the first condition (a), requires that the two distances should be different.

The second condition (b), requires that the object being imaged indeed exhibits the assumed dimension so that a given face to be a live human face, ed≈70 mm. In this case, the errors should not be larger than the maximum error ($N*DAC_{STEP}$) and they should be quite similar (the difference should not be higher than half $DAC_{STEP}$). This condition assures that $ERR_{D_{EST}} \approx 0$ and $ERR_D \approx ERR_{PLP}$ as in the first embodiment.

If the current face is false (condition (b) is not respected), and so compensation must not be done until a new valid face is received.

If conditions (a) and (b) are respected, then $ERR_{PLP}$ will be estimated as follows:

$$ERR_{PLP} = \frac{ERR_1 + ERR_2}{2} \quad [38]$$

The new updated calibration parameters (which should be used further to improve AF speed and reduced lens wobble effect) are:

$$\begin{cases} DAC_{FAR}^{NEW} = DAC_{FAR}^{PLP} + ERR_{PLP} & [39] \\ DAC_{NEAR}^{NEW} = DAC_{NEAR}^{PLP} + ERR_{PLP} & [40] \end{cases}$$

As indicated, the maximum estimated error should not be higher than $N*DAC_{STEP}$ ($ERR^{PLP} \leq N*DAC_{STEP}$). The value of N can be determined by the image acquisition device or camera module manufacturer according to how tightly they wish the estimated compensation process to operate. Thus, the larger the value of N the greater the possibility of calibrating based on a poorly estimated distance to an object.

It will be appreciated that many variations of the above described embodiments are possible and that for example features and functions described in relation to the first embodiment are applicable to the second embodiment and vice versa where possible.

The invention claimed is:

1. A method for dynamically calibrating an image capture device comprising:
   a) determining a distance ($D_{CRT}$, $D_{EST}$) to an object within a scene being imaged by said image capture device;
   b) determining a first lens actuator setting ($DAC^{INIT}$) as a function of: a stored calibrated lens actuator setting ($DAC_{NEAR}^{PLP}$) for a pre-determined near focus distance ($D_{NEAR}$), a stored calibrated lens actuator setting ($DAC_{FAR}^{PLP}$) for a pre-determined far focus distance ($D_{FAR}$), a focal length (f) of the image capture device and said determined distance ($D_{CRT}$, $D_{EST}$);
   c) determining a second lens actuator setting ($DAC^{FOCUS}$) providing maximum sharpness for said object in a captured image of said scene; and
   d) storing said determined distance ($D_{CRT}$, $D_{EST}$), first lens actuator setting ($DAC^{INIT}$) and second lens actuator setting ($DAC^{FOCUS}$);
   e) subsequently repeating steps a) to c) at a second determined distance separated from said first determined distance;
   f) determining a calibration correction ($ERR_{NEAR}^{PLP}$, $ERR_{FAR}^{PLP}$) for each of said calibrated lens actuator settings ($DAC_{NEAR}^{PLP}$, $DAC_{FAR}^{PLP}$) as a function of at least: respective differences between said second lens actuator setting ($DAC^{FOCUS}$) and said first lens actuator setting ($DAC^{INIT}$) for each of said first and second determined distances; and
   g) adjusting the stored calibrated lens actuator settings according to said determined calibration corrections.

2. A method according to claim 1 further comprising, prior to said step of determining a first lens actuator setting ($DAC^{INIT}$), adjusting said stored calibrated lens actuator settings ($DAC_{NEAR}^{PLP}$, $DAC_{FAR}^{PLP}$) as a function of an operating temperature of the device and/or a function of an operating orientation of the device; and
   storing said operating temperature and/or operating orientation of the device with said determined distance ($D_{CRT}$, $D_{EST}$), first lens actuator setting ($DAC^{INIT}$) and second lens actuator setting ($DAC^{FOCUS}$).

3. A method according to claim 1 wherein determining said second lens actuator setting ($DAC^{FOCUS}$) comprises beginning a search using said first lens actuator setting.

4. A method according to claim 1 wherein said first and second determined distances are separated from one another by at least the respective depths of field at said first and second determined distances.

5. A method according to claim 1 comprising periodically repeating steps a) to g).

6. A method according to claim 1 wherein there is a linear relationship between a lens actuator setting and a lens position required to focus at a given distance.

7. A method according to claim 1 wherein determining said first lens actuator setting ($DAC^{INIT}$) is based on the following formula:

$$DAC^{INIT} = DAC_{FAR}^{PLP} + (DAC_{NEAR}^{PLP} - DAC_{FAR}^{PLP}) * \frac{(D_{FAR} - D_{CRT,EST})}{(D_{FAR} - D_{NEAR})} * \frac{(D_{NEAR} - f)}{(D_{CRT,EST} - f)}$$

where $DAC_{FAR}^{PLP}$ is said stored calibrated lens actuator setting for a pre-determined far focus distance;
$DAC_{NEAR}^{PLP}$ stored calibrated lens actuator setting for a pre-determined near focus distance;
$D_{FAR}$ is said far focus distance
$D_{NEAR}$ is said near focus distance
$D_{CRT,EST}$ is said determined distance; and
f is said focal length.

8. The method of claim 1 wherein said step of determining said distance to an object comprises measuring said distance ($D_{CRT}$).

9. A method according to claim 1 comprising determining said calibration correction ($ERR_{NEAR}^{PLP}$, $ERR_{FAR}^{PLP}$) for each of said calibrated lens actuator settings ($DAC_{NEAR}^{PLP}$, $DAC_{FAR}^{PLP}$) as a function of: respective differences between said second lens actuator setting ($DAC_{D_{CRT}}^{FOCUS}$) and said first lens actuator setting ($DAC_{D_{CRT}}^{INIT}$) for each of said first and second determined distances; respective differences between said first and second determined distances and one of said pre-determined near or far focus distances; a difference between said pre-determined near and far focus distances; and respective differences between said first and second determined distances and said focal length (f).

10. A method according to claim 9 wherein said calibration correction for each of said calibrated lens actuator settings, $ERR_{FAR}^{PLP}$ and $ERR_{NEAR}^{PLP}$, is calculated according to the following formulae:

$$\begin{cases} ERR_{FAR}^{PLP} = \dfrac{\alpha_{D_2} * ERR_{D_1} - \alpha_{D_1} * ERR_{D_2}}{\alpha_{D_2} - \alpha_{D_1}} \\ ERR_{NEAR}^{PLP} = \dfrac{(1 - \alpha_{D_2}) * ERR_{D_1} - (1 - \alpha_{D_1}) * ERR_{D_2}}{\alpha_{D_1} - \alpha_{D_2}} \end{cases}$$

where $D_1$ and $D_2$ are said first and second determined distances respectively, $ERR_{D_1}$ and $ERR_{D_2}$ are computed using the following formula:

$$ERR_{D_1} = DAC_{D_1}^{FOCUS} - DAC_{D_1}^{INIT}$$

$$ERR_{D_2} = DAC_{D_2}^{FOCUS} - DAC_{D_2}^{INIT}$$

and $\alpha_{D_1}$ and $\alpha_{D_2}$ are computed using the following formulae:

$$\begin{cases} \alpha_{D_1} = \dfrac{(D_{FAR} - D_1)}{(D_{FAR} - D_{NEAR})} * \dfrac{(D_{NEAR} - f)}{(D_1 - f)} \\ \alpha_{D_2} = \dfrac{(D_{FAR} - D_2)}{(D_{FAR} - D_{NEAR})} * \dfrac{(D_{NEAR} - f)}{(D_2 - f)} \end{cases}$$

11. A method according to claim 10 wherein said adjusting the stored calibrated lens actuator settings comprises providing new settings $DAC_{FAR}^{NEW}$ and $DAC_{NEAR}^{NEW}$ according to the formulae:

$$\begin{cases} DAC_{FAR}^{NEW} = DAC_{FAR}^{PLP} + ERR_{FAR}^{PLP} \\ DAC_{NEAR}^{NEW} = DAC_{NEAR}^{PLP} + ERR_{NEAR}^{PLP} \end{cases}$$

12. The method of claim 1 wherein the object is a human face.

13. The method of claim 1 wherein said step of determining said distance to an object comprises estimating a distance ($D_{EST}$) to said object based on an imaged size of said object and an assumed dimension of said object.

14. The method of claim 13 comprising testing whether a potential correction resulting from an estimated distance exceeds a threshold value before either: storing said determined distance, first lens actuator setting and second lens actuator setting; or determining said calibration correction.

15. The method of claim 14 wherein said threshold is a function of an absolute difference ($DAC_{STEP}$) between the corresponding actuator settings at a far limit of focus ($D_F$) and a near limit of focus ($D_N$) at a given focus distance (D).

16. A non-transitory computer program product comprising a computer readable medium on computer readable instructions are stored and which when executed on an image capture device are arranged to perform the steps of claim 1.

17. An image capture device configured to perform the steps of claim 1.

* * * * *